US009723546B2

(12) United States Patent
Tomida et al.

(10) Patent No.: US 9,723,546 B2
(45) Date of Patent: Aug. 1, 2017

(54) WIRELESS COMMUNICATION DEVICE, NON-TRANSITORY COMPUTER-READABLE RECORDING MEDIUM, MASTER DEVICE, AND SLAVE DEVICE

(71) Applicant: CASIO COMPUTER CO., LTD., Shibuya-ku, Tokyo (JP)

(72) Inventors: Takahiro Tomida, Hamura (JP); Tsutomu Terazaki, Saitama (JP); Ryo Okumura, Fussa (JP); Toshihiro Takahashi, Kunitachi (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 107 days.

(21) Appl. No.: 14/818,996

(22) Filed: Aug. 5, 2015

(65) Prior Publication Data
US 2016/0057695 A1 Feb. 25, 2016

(30) Foreign Application Priority Data

Aug. 22, 2014 (JP) .................................. 2014-168985

(51) Int. Cl.
| | |
|---|---|
| *H04W 48/16* | (2009.01) |
| *H04W 4/00* | (2009.01) |
| *H04W 8/00* | (2009.01) |
| *H04W 76/02* | (2009.01) |
| *H04L 29/08* | (2006.01) |
| *H04W 84/20* | (2009.01) |

(52) U.S. Cl.
CPC ....... *H04W 48/16* (2013.01); *H04L 29/08648* (2013.01); *H04L 67/16* (2013.01); *H04W 4/008* (2013.01); *H04W 8/005* (2013.01); *H04W 76/023* (2013.01); *H04L 67/141* (2013.01); *H04W 84/20* (2013.01)

(58) Field of Classification Search
CPC ..... H04W 48/16; H04W 4/008; H04W 8/005; H04W 76/023
USPC .................................................. 370/328, 329
See application file for complete search history.

(56) References Cited

U.S. PATENT DOCUMENTS

2015/0350334 A1* 12/2015 Liu ....................... H04L 67/141
709/227

FOREIGN PATENT DOCUMENTS

JP 2012142877 A 7/2012

* cited by examiner

*Primary Examiner* — Ronald B Abelson
(74) *Attorney, Agent, or Firm* — Holtz, Holtz & Volek PC (57) ABSTRACT

An objective of the present disclosure is to provide a wireless communication device that is capable of efficiently searching another wireless communication device that is capable of providing a required service. A master device, when the master device receives an advertisement from a slave device, transmits, to the slave device, a scan request that includes information on a requested service that the master device requires. The slave device, which has received the scan request, decides whether or not the slave device itself is capable of providing the requested services, and transmits, to the master device, a scan response that includes a result of the decision. When the decision result included in the scan response indicates that the slave device is capable of providing the requested service, the master device establishes a connection to the slave device.

9 Claims, 8 Drawing Sheets

Scan Request

FIG. 3B

Scan Request

FIG. 5A

| AD Type:<br>Service UUID<br>(1 BYTE) | List of Service UUID<br>(Length-1 BYTES) |
|---|---|

FIG. 5B

| AD Type:<br>Service Data<br>(1 BYTE) | Service UUID+Flag<br>(Length-1 BYTES) |
|---|---|

WIRELESS COMMUNICATION DEVICE, NON-TRANSITORY COMPUTER-READABLE RECORDING MEDIUM, MASTER DEVICE, AND SLAVE DEVICE

CROSS-REFERENCE TO RELATED APPLICATION

This application claims the benefit of Japanese Patent Application No. 2014-168985, filed on Aug. 22, 2014, the entire disclosure of which is incorporated by reference herein.

FIELD

The present disclosure relates to a wireless communication device, a computer-readable recording medium, a master device, and a slave device.

BACKGROUND

A master device, which is a wireless communication device that carries out wireless communication based on the Bluetooth (Registered Trademark) low energy, a short range wireless communication standard, receives identification information, referred to as advertisement, which a slave device, another wireless communication device that is a communication partner, transmits periodically, and, after transmitting a connection request to the slave device, carries out transmission and reception of data with the slave device (refer to, for example, Unexamined Japanese Patent Application Kokai Publication No. 2012-142877).

SUMMARY

In a wireless communication device that carries out wireless communication based on the Bluetooth (Registered Trademark) low energy as described above, a slave device is able to inform, through an advertisement, services that the slave device itself is capable of providing. However, there is a limit to the amount of data that an advertising packet is capable of containing, and the slave device is not always able to inform all services that the slave device itself is capable of providing. Thus, when a master device, in searching a slave device that is capable of providing a service that the master device itself requires, is not able to decide, based on received advertisements, whether or not the slave device that has transmitted the advertisements is capable of providing the service, the master device needs to establish a connection to the slave device and, through data communication, check whether or not the slave device is capable of providing the service, in detail. Further, when the slave device is incapable of providing the service, the master device needs to further check, with another slave device, whether or not the other slave device is similarly capable of providing the service, causing an inefficiency.

The present disclosure is made in consideration of the above-described problem, and an objective of the disclosure is to efficiently search another wireless communication device that is capable of providing required services.

To achieve the above-described objective, a wireless communication device according to a first aspect of the present disclosure includes:

a communicator that acquires identification information transmitted from another wireless communication device, and, when the communicator acquires the identification information, transmits, to the other wireless communication device, a scan request that includes an inquiry of whether or not the other wireless communication device is capable of providing a predetermined service; and a controller that, based on a response from the other wireless communication device to the scan request, establishes a connection to the other wireless communication device.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present disclosure will be described below with reference to the accompanying drawings.

Figure 1:
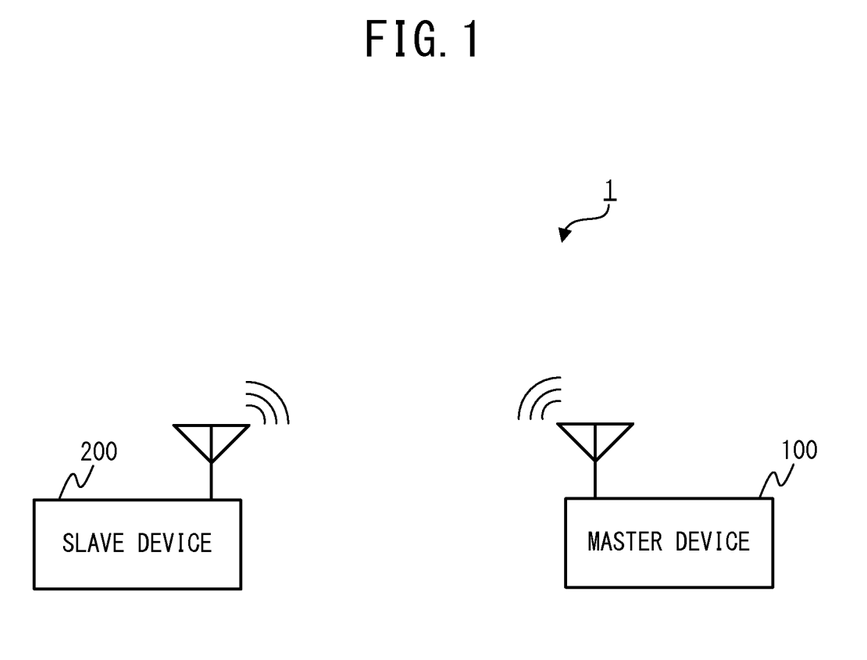
FIG. 1 is a diagram illustrating a configuration example of a wireless communication system according to an embodiment.

FIG. 1 is a diagram illustrating a configuration example of a wireless communication system 1 according to an embodiment of the present disclosure.

In the configuration example illustrated in FIG. 1, a wireless communication system 1 includes a master device 100 as a wireless communication device and a slave device 200 as a wireless communication device different from the master device 100. The master device 100 and the slave device 200 carry out wireless communication with each other based on the Bluetooth (Registered Trademark) low energy (hereinafter, referred to as BLE). The BLE is a standard (mode) that has been formulated with the object of achieving a low power consumption on the basis of a short range wireless communication standard that is referred to as Bluetooth (Registered Trademark). The master device 100 is a device that uses services provided by the slave device 200 (for example, measured data). The slave device 200 is a device that provides the master device 100 with services (for example, measured data).

The master device 100 is, for example, an apparatus, such as a mobile phone, a smartphone, a tablet personal computer, and a laptop personal computer, and is also a terminal that has a wireless communication function based on the BLE. In the embodiment, as an example, the master device 100 is configured with a smartphone. The master device 100 receives various data from the slave device 200, and, based on the received data, displays various information on a display 108, which will be described later, and outputs sound, such as an alarm, from a speaker 106, which will be described later (refer to FIG. 2).

The slave device 200 is, for example, an apparatus that is capable of providing a service to the master device 100, such as a temperature sensor that is capable of providing a temperature measurement service, and is also a terminal that has a wireless communication function based on the BLE.

In the wireless communication carried out based on the BLE, before transmission and reception of data are carried out between the master device 100 and the slave device 200, the slave device 200 transmits advertisements and the master device 100 receives the advertisements. The advertisement means identification information with which the slave device 200 informs the master device 100 of the existence of the slave device 200 itself.

In the BLE, a frequency band from 2400 to 2483.5 MHz, which is divided into 40 channels with a width of 2 MHz, is used. Among the 40 channels, 3 advertising channels with center frequencies of 2402, 2426, and 2480 MHz (channels with advertising channel indices of 37, 38, and 39) are used for advertising. The other 37 data channels (channels with data channel indices of 0 to 36) are used for data communication after a connection has been established between the master device 100 and the slave device 200.

Next, a hardware configuration and the like of the wireless communication system 1 according to the embodiment will be described.

Figure 2:
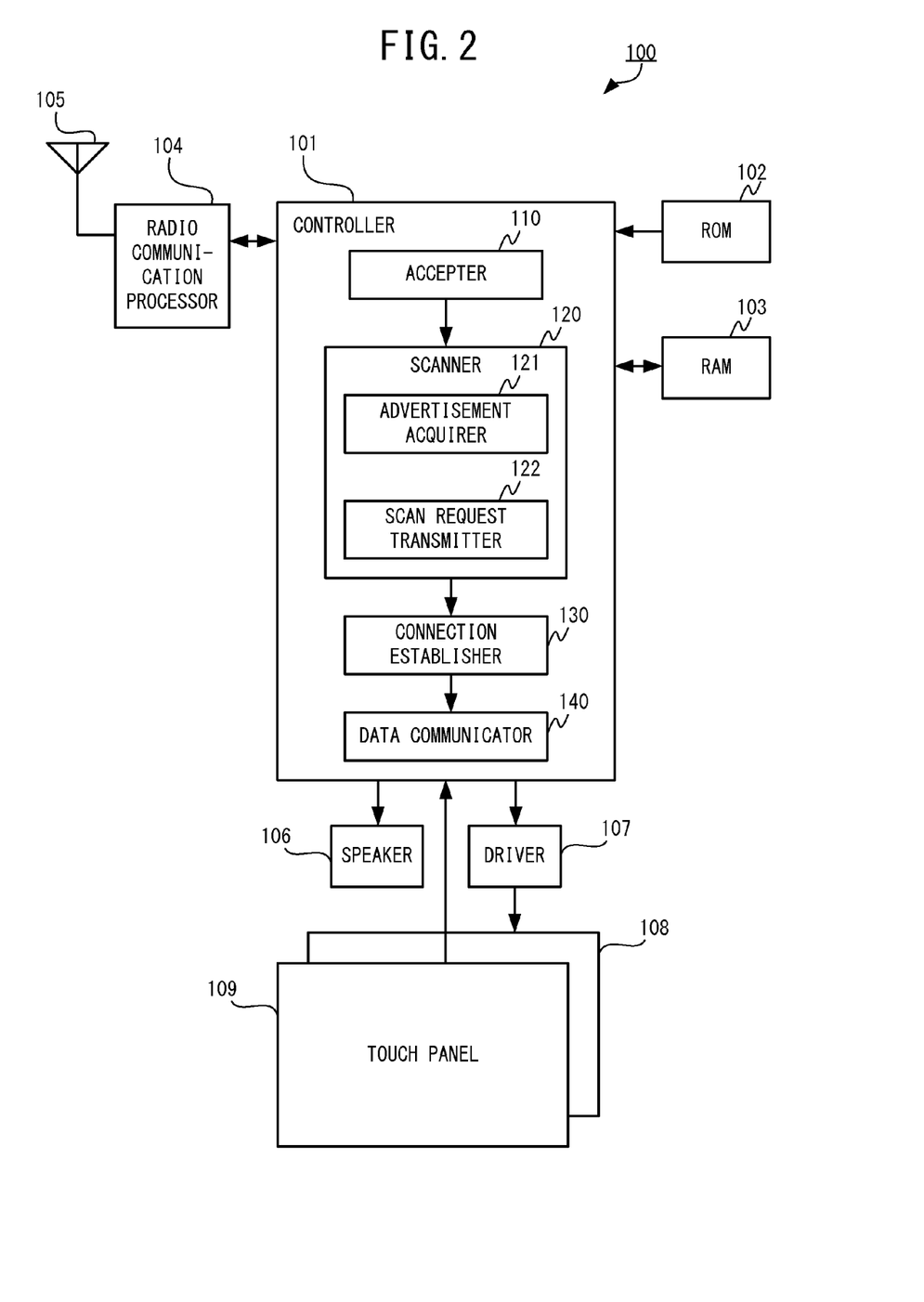
FIG. 2 is a diagram illustrating a configuration example of a master device according to the embodiment.

FIG. 2 is a block diagram schematically illustrating a configuration example of the master device 100 according to the embodiment. As illustrated in FIG. 2, the master device 100 includes a controller 101, a ROM (Read Only Memory) 102, a RAM (Random Access Memory) 103, a wireless communication processor 104, an antenna 105, a speaker 106, a driver 107, a display 108 and a touch panel 109.

The controller 101 is, for example, configured with a CPU (Central Processing Unit). The controller 101 controls various functions that the master device 100 has by executing software processing in accordance with programs (for example, a program to achieve an operation of the master device 100 illustrated in FIG. 7, which will be described later), which are stored in the ROM 102.

The ROM 102 is configured with a nonvolatile memory, such as a flash memory, and, as described above, stores programs and data with which the controller 101 controls various functions.

The RAM 103 is configured with a volatile memory and used as a work area into which the controller 101 store data temporarily to carry out various processing.

The wireless communication processor 104 is configured with, for example, a wireless frequency (RF) circuit, a baseband (BB) circuit, or the like. The wireless communication processor 104 carries out transmission and reception of wireless signals based on the BLE via the antenna 105.

The speaker 106 outputs sound based on sound data from the controller 101. The driver 107 outputs, to the display 108, an image signal based on image data output from the controller 101. The display 108 is configured with, for example, an LCD (Liquid Crystal Display), an EL (Electroluminescence) display, or the like. The display 108 displays an image in accordance with the image signal output from the driver 107.

The touch panel 109 is an interface that is arranged on the front surface of the display 108 and used to input manipulation by users. The touch panel 109, for example, has not-illustrated transparent electrodes built-in, detects a point at which the voltage changes as a touch point when a finger or the like of a user touches the touch panel 109, and outputs information on the touch point to the controller 101 as an input command.

Next, a functional configuration of the controller 101 of the master device 100 will be described. As illustrated in FIG. 2, the controller 101 functions as an accepter 110, a scanner 120, a connection establisher 130, and a data communicator 140.

The accepter 110 accepts services that the master device 100 requires (hereinafter, referred to as requested service). For example, the accepter 110 accepts a requested service from a user via the touch panel 109. Alternatively, for example, the accepter 110 accepts a requested service from an application that the master device 100 executes.

The scanner 120, by scanning the three advertising channels in order, searches a slave device 200 that is capable of providing requested services, which are accepted by the accepter 110. More specifically, the scanner 120 includes an advertisement acquirer 121 and a scan request transmitter 122.

The advertisement acquirer 121, by scanning the three advertising channels in order, acquires an advertisement transmitted from a slave device 200.

The scan request transmitter 122 transmits a scan request, which includes an inquiry of whether or not the slave device 200 is capable of providing requested services, to the slave device 200 that has transmitted the advertisement acquired by the advertisement acquirer 121.

Figure 3A:
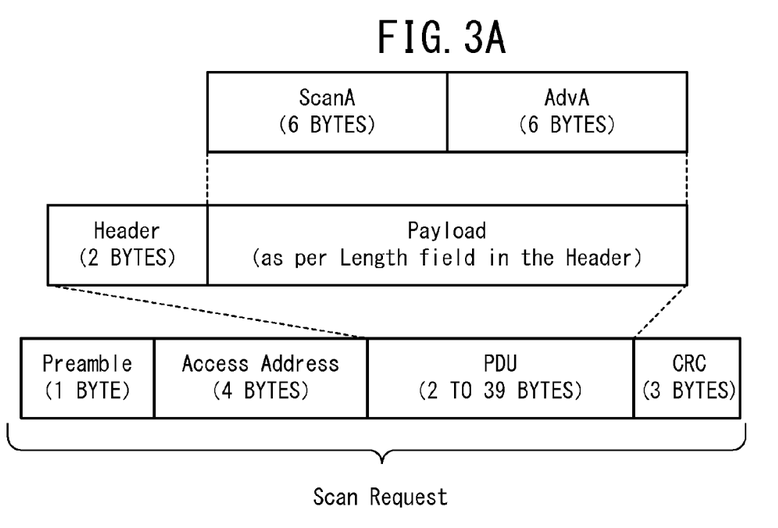
FIG. 3A is a diagram illustrating a format of a scan request packet as defined by the conventional BLE standard.
Figure 3B:
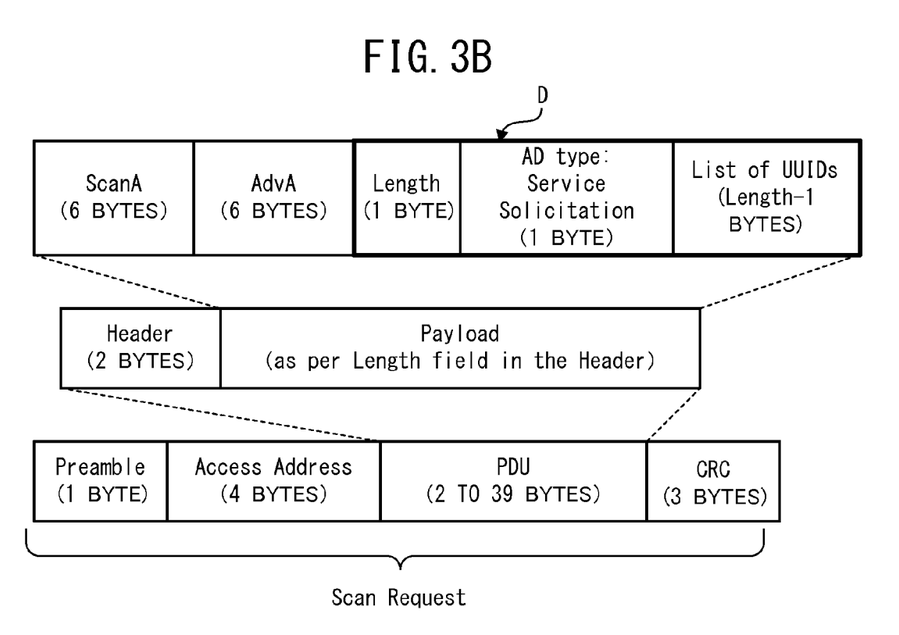
FIG. 3B is a diagram illustrating a format of a scan request packet transmitted by a scan request transmitter according to the embodiment.

A scan request packet will be described below. FIGS. 3A and 3B are diagrams illustrating a format of a scan request packet defined by the conventional BLE standard and a format of a scan request packet transmitted by the scan request transmitter 122, respectively. As illustrated in FIG. 3A, the payload of a scan request packet defined by the conventional BLE standard contains only the device address (ScanA: Scan Address) of the master device 100, which carries out scan, and the device address (AdvA: Advertisement Address) of the slave device 200, which carries out advertising.

On the other hand, as illustrated in FIG. 3B, a scan request packet according to the embodiment is expanded so as to contain, in the payload thereof, not only a ScanA and an AdvA but also data D (a portion enclosed by a heavy line). Specifically, the data D contains a length, Service Solicitation as an AD type, and a value indicating a list of UUIDs.

The AD type, which is defined in the BLE standard, indicates a type of data that can be contained in an advertising packet and a scan response packet. Service Solicitation is an AD type. In the wireless communication based on the conventional BLE standard, Service Solicitation is used in such a way that, when a slave device needs to use a service that a master device is capable of providing, the slave device transmits an advertisement containing Service Solicitation, which is specified as the AD type, and a value of the UUID (Universally Unique Identifier) of the service, which the slave device needs to use. When the master device, which has received an advertisement in which Service Solicitation is specified as the AD type, is able to provide a service corresponding to the UUID, the master device transmits a connection request to the slave device that has transmitted the advertisement and establishes a connection to the slave device. As a result, a wireless communication device that has been operating as a master device operates as a slave device that is a service provider, and a wireless communication device that has been operating as a slave device operates as a slave device that is a service user.

In the embodiment, the AD type of Service Solicitation, which has been used in the wireless communication based on the conventional BLE as described above, is used for the master device 100 to inquire of the slave device 200 whether or not the slave device 200 is capable of providing requested services. Specifically, in the data D illustrated in FIG. 3B, Service Solicitation is specified as the AD type and a value indicating a list of the UUIDs of requested services is included.

There is a limit to the amount of data that a scan request packet is able to contain, as illustrated in FIGS. 3A and 3B. However, since the payload of a scan request is able to contain at most 37 bytes of data, it is possible to expand a scan request packet so that the payload is able to further contain data D as illustrated in FIG. 3B even if the payload contains 6 bytes of ScanA and 6 bytes of AdvA.

The scan request transmitter 122 may decide whether or not to transmit the above-described scan request in accordance with the type of an acquired advertisement. In the BLE standard, four types of advertisements, namely ADV_IND indicating that a connection request and a scan request is acceptable, ADV_DIRECT_IND indicating that only a connection request from a specified device is acceptable, ADV_NONCONN_IND indicating that neither connection request nor scan request from any device is acceptable, and ADV_SCAN_IND indicating that only a scan request is acceptable, are defined. Thus, the scan request transmitter 122 may, for example, decide to transmit the above-described expanded scan request when the type of an acquired advertisement is ADV_IND, and not to transmit the scan request when the type of an acquired advertisement is other than ADV_IND. That is because, when the type of an acquired advertisement is ADV_DIRECT_IND or ADV_NONCONN_IND, the slave device 200 that has transmitted the advertisement does not accept a scan request from the master device 100. That is also because, when the type of an acquired advertisement is ADV_SCAN_IND, the slave device 200 that has transmitted the advertisement, even when the slave device 200 accepts a scan request from the master device 100, does not accept a connection request and, as a consequence, the master device 100 is not able to connect with the slave device 200.

The connection establisher 130 establishes a connection to the slave device 200 based on a response from the slave device 200 to the scan request that the scan request transmitter 122 has transmitted.

For example, the connection establisher 130 receives a scan response from the slave device 200 to the scan request that the scan request transmitter 122 has transmitted. When the received scan response indicates that the slave device 200 is capable of providing requested services, the connection establisher 130 transmits a connection request to the slave device 200 that has transmitted the scan response. Then, the connection establisher 130 establishes a connection to the slave device 200.

After a connection to the slave device 200 has been established by the connection establisher 130, the data communicator 140 carries out data communication with the slave device 200 through the afore-described 37 data channels.

Figure 4:
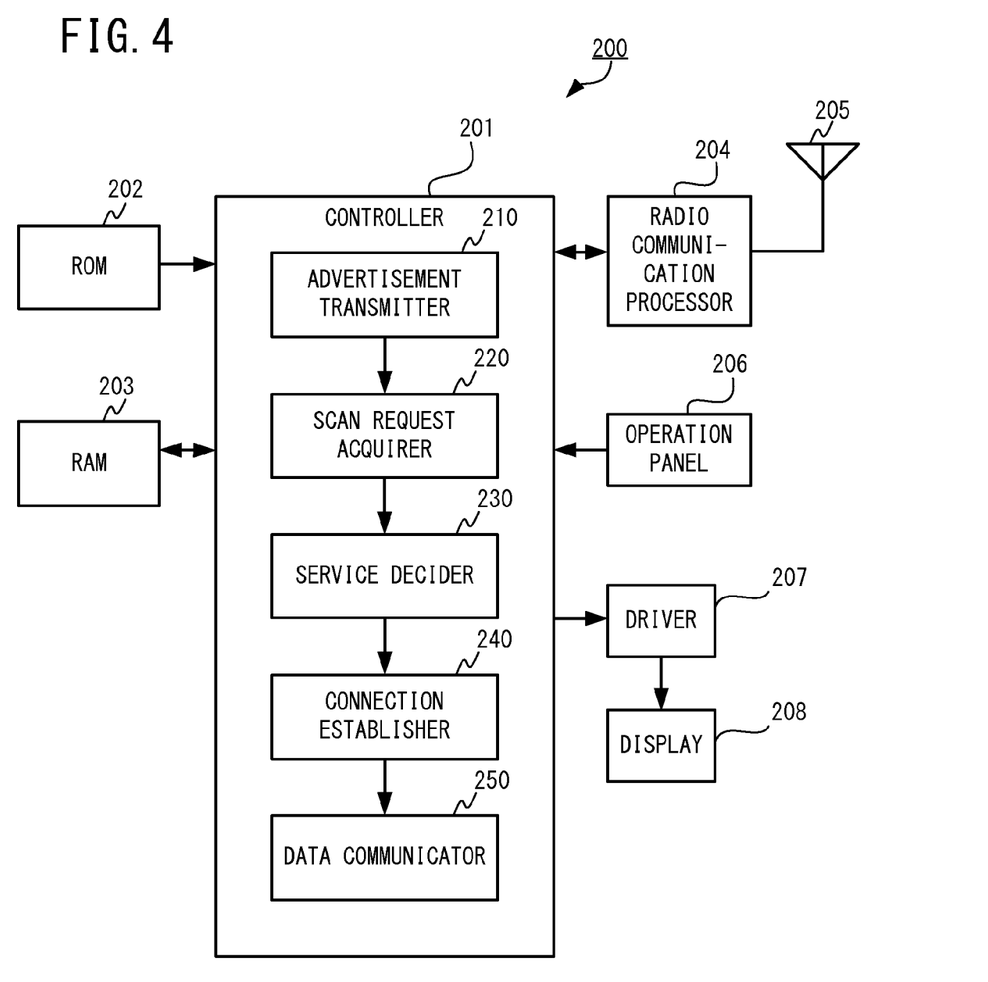
FIG. 4 is a diagram illustrating a configuration example of a slave device according to the embodiment.

FIG. 4 is a block diagram schematically illustrating a configuration example of the slave device 200 according to the embodiment. As illustrated in FIG. 4, the slave device 200 includes a controller 201, a ROM 202, a RAM 203, a wireless communication processor 204, an antenna 205, an operation panel 206, a driver 207, and a display 208.

The controller 201 is configured with, for example, a CPU. The controller 201 controls various functions that the slave device 200 has by executing software processing in accordance with programs (for example, a program to achieve an operation of the slave device 200 illustrated in FIG. 8, which will be described later), which are stored in the ROM 202.

The ROM 202 is configured with a nonvolatile memory, such as a flash memory, and, as described above, stores programs and data with which the controller 201 controls various functions.

The RAM 203 is configured with a volatile memory and used as a work area into which the controller 201 stores data temporarily to carry out various processing.

The wireless communication processor 204 is configured by using, for example, a wireless frequency (RF) circuit, a baseband (BB) circuit, or the like. The wireless communication processor 204 carries out transmission and reception of wireless signals based on the BLE via the antenna 205.

The operation panel 206 is configured with, for example, a switch or the like and used for inputting user operations, such as power-on and power-off.

The driver 207 outputs, to the display 208, an image signal based on image data output from the controller 201. The display 208 is configured with, for example, an LCD, an EL display, or the like. The display 208 displays an image based on the image signal output from the driver 207.

Next, a functional configuration of the controller 201 of the slave device 200 will be described. As illustrated in FIG. 4, the controller 201 functions as an advertisement transmitter 210, a scan request acquirer 220, a service decider 230, a connection establisher 240, and a data communicator 250.

The advertisement transmitter 210 transmits advertisements by using the advertising channels periodically with a time interval, which is referred to as an advertisement interval. In the embodiment, the advertisement transmitter 210 transmits advertisements with a first predetermined interval in a regular period, that is, in advertising before receiving a scan request from the master device.

When the slave device 200 itself is capable of providing requested services corresponding to an inquiry included in a scan request, the advertisement transmitter 210 transmits advertisements with a second predetermined interval, which is shorter than the first predetermined interval. Further, in this case, the advertisement transmitter 210 selects ADV_DIRECT_IND, which indicates that only a connection request from the master device 100 that has transmitted the scan request is acceptable, as the type of advertisement and transmits advertisements. An operation of transmitting advertisements having a type of advertisement of ADV_DIRECT_IND with a cycle shorter than a regular cycle as described above is referred to as High Duty Cycle Directed Advertising. Since, in High Duty Cycle Directed Advertising, advertising packets are transmitted repetitively with a short cycle, it is stipulated that High Duty Cycle Directed Advertising lasts no more than 1.28 seconds in consideration of power consumption, interference from wireless channels to other devices, and the like.

The scan request acquirer 220 acquires a scan request from the master device 100 that has received the advertisement transmitted by the advertisement transmitter 210.

When a scan request is acquired by the scan request acquirer 220, the service decider 230 decides whether or not the slave device 200 itself is capable of providing the requested services corresponding to an inquiry included in the scan request. For example, with respect to the list of UUIDs included in the scan request packet and the AD type of which is Service Solicitation, the service decider 230 identifies services corresponding to UUIDs included in the list as requested services. The service decider 230 then decides whether or not each of the requested services is included in the list of services that the slave device 200 itself is capable of providing, which has been recorded in the ROM or the like in the slave device 200 itself in advance.

When the service decider 230 decides that the slave device 200 itself is capable of providing at least one requested service corresponding to an inquiry included in the acquired scan request, the service decider 230 transmits, to the master device 100 that has transmitted the scan request, a scan response indicating that the slave device 200 is capable of providing at least one requested service. When the service decider 230 decides that the slave device 200 itself is incapable of providing any of the requested services, the service decider 230 transmits, to the master device 100 that has transmitted the scan request, a scan response indicating that the slave device 200 is incapable of providing the requested services.

Figure 5A:
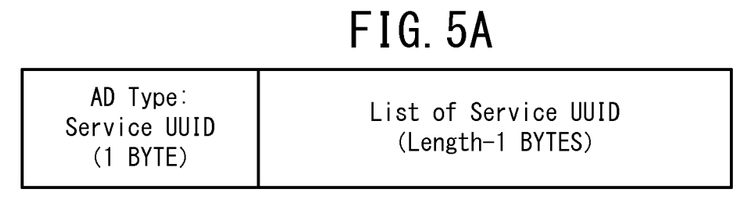
FIG. 5A is a diagram illustrating an example of a format of a portion of a scan response packet according to the embodiment.
Figure 5B:
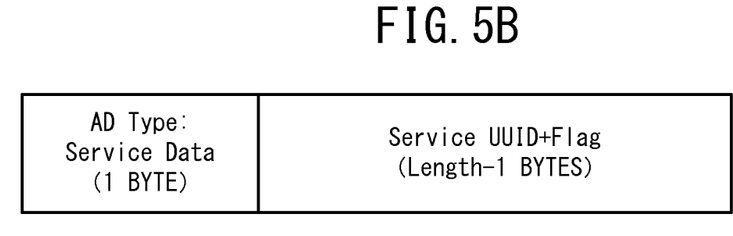
FIG. 5B is a diagram illustrating another example of the format of the portion of the scan response packet according to the embodiment.

A scan response packet will be described below. FIGS. 5A and 5B are diagrams illustrating an example and another example of a format of a portion of a scan response packet according to the embodiment, respectively. A scan response according to the embodiment is configured in a similar format to a scan request packet illustrated in FIG. 3B, and FIGS. 5A and 5B illustrate formats for data that are contained in a scan response in substitution for the AD type and the list of UUIDs, which are included in the data D in FIG. 3B.

In the example illustrated in FIG. 5A, Service UUID is specified as the AD type, and a value indicating a list of Service UUIDs is included. In the list of Service UUIDs, the UUIDs of services that the slave device 200 itself is capable of providing within the list of UUIDs included in the scan request with an AD type of Service Solicitation are included. For example, when the UUIDs of services S1, S2, and S3 are included, as requested services, in the list of UUIDs included in the scan request with an AD type of Service Solicitation from the master device 100 and the service decider 230 decides that the slave device 200 itself is capable of providing the services S1 and S2, the service decider 230 transmits a scan response including the UUIDs of the services S1 and S2 in the list of Service UUIDs.

In the example illustrated in FIG. 5B, Service Data is specified as the AD type, and a value indicating Service UUIDs and flags is included. The Service UUIDs correspond to UUIDs included in the list of UUIDs included in the scan request with an AD type of Service Solicitation. Each of the flags is associated with each Service UUID and indicates whether or not the slave device 200 itself is capable of providing a service corresponding to the Service UUID. Into the flag, for example, a value of 0x01 and a value of 0x00 are stored when the slave device 200 is capable and incapable of providing a service corresponding to the Service UUID, respectively. For example, when the UUIDs of services S1, S2, and S3 are included, as requested services, in the list of UUIDs included in the scan request with an AD type of Service Solicitation from the master device 100 and the service decider 230 decides that the slave device 200 itself is capable of providing the services S1 and S2, the service decider 230 transmits a scan response in which the UUID of the service S1, the UUID of the service S2, and the UUID of the service S3 are associated with the flag 0x01, the flag 0x01, and the flag 0x00, respectively.

The connection establisher 240 establishes a connection to the master device 100 based on the result of decision by the service decider 230. For example, when the service decider 230 decides that the slave device 200 is capable of providing a requested service included in the scan request, the service decider 230 transmits, to the master device 100, a scan response indicating that the slave device 200 is capable of providing the requested service. Thereafter, the connection establisher 240 receives a connection request from the master device that has received an advertisement transmitted by the advertisement transmitter 210 and establishes a connection to the master device 100.

After a connection to the master device 100 has been established by the connection establisher 240, the data communicator 250 carries out data communication with the master device 100 through the afore-described 37 data channels.

Figure 6:
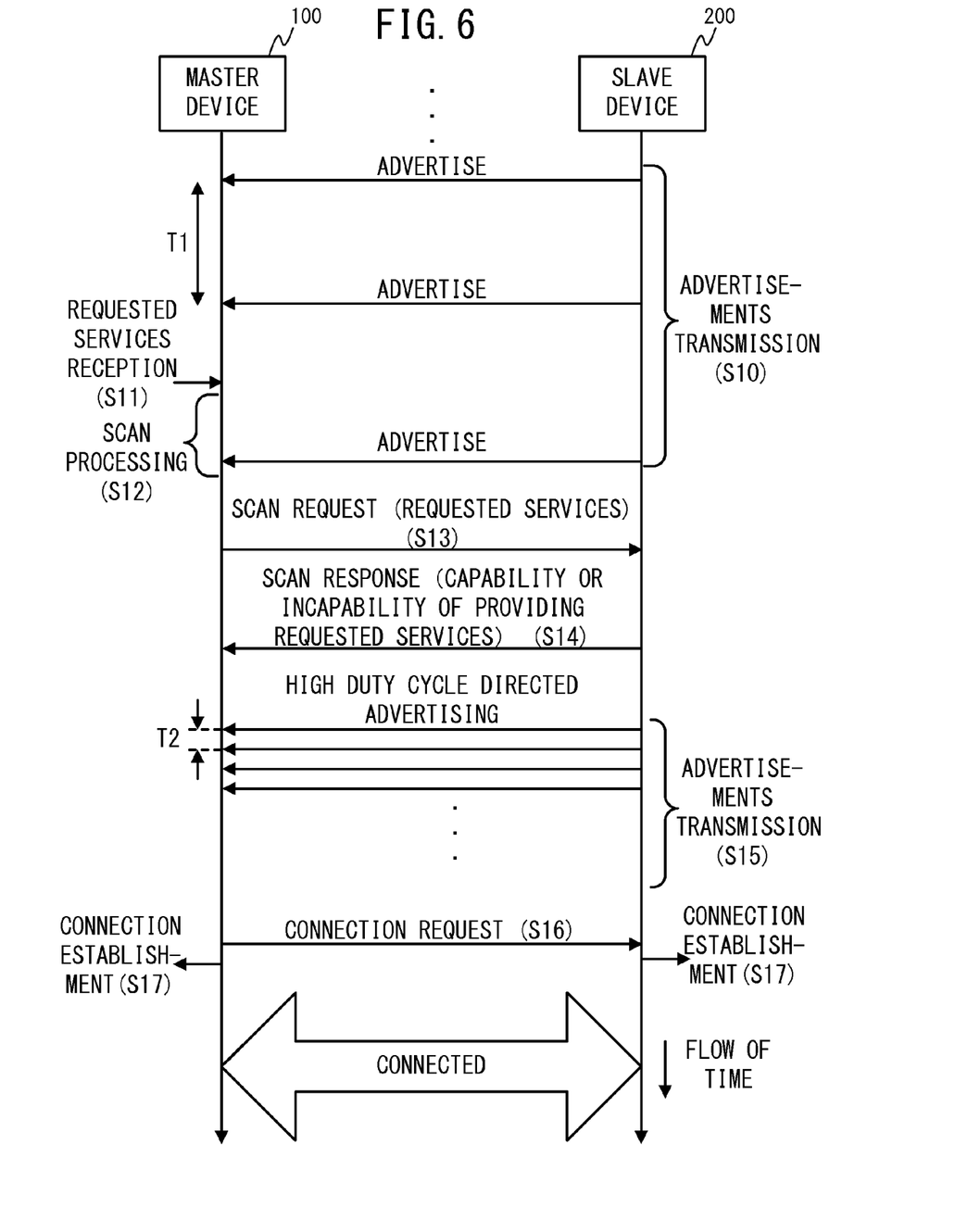
FIG. 6 is a sequence diagram illustrating an example of an operation of the wireless communication system according to the embodiment.

Next, an example of an operation of the wireless communication system 1 in the embodiment will be described with reference to a sequence diagram in FIG. 6.

The slave device 200, for example, triggered by the current time reaching a predetermined time, transmits advertisements periodically with a first predetermined interval T1 using the advertising channels (step S10).

The master device 100, for example, during execution of an application for data acquisition, accepts, as requested services, services that the application requests (step S11), and carries out scan processing to receive an advertisement from the slave device 200 (step S12).

When the master device 100 receives an advertisement from the slave device 200, the master device 100 transmits, to the slave device 200 that has transmitted the advertisement, a scan request that includes an inquiry of whether or not the slave device 200 is capable of providing the requested services (step S13).

The slave device 200 that has received the scan request transmits, to the master device 100, a scan response indicating whether or not the slave device 200 is capable of providing the requested services included in the scan request (step S14). When the slave device 200 decides that the slave device 200 itself is capable of providing at least one requested service, the slave device 200 transmits advertisements with a second predetermined interval T2 in High Duty Cycle Directed Advertising (step S15).

When the scan response received from the slave device 200 indicates that the slave device 200 is capable of providing some requested services, the master device 100, after receiving the advertisements from the slave device 200, transmits a connection request (step S16). In consequence, connection processing is carried out at the master device 100 and the slave device 200, and a connection is established (step S17).

Figure 7:
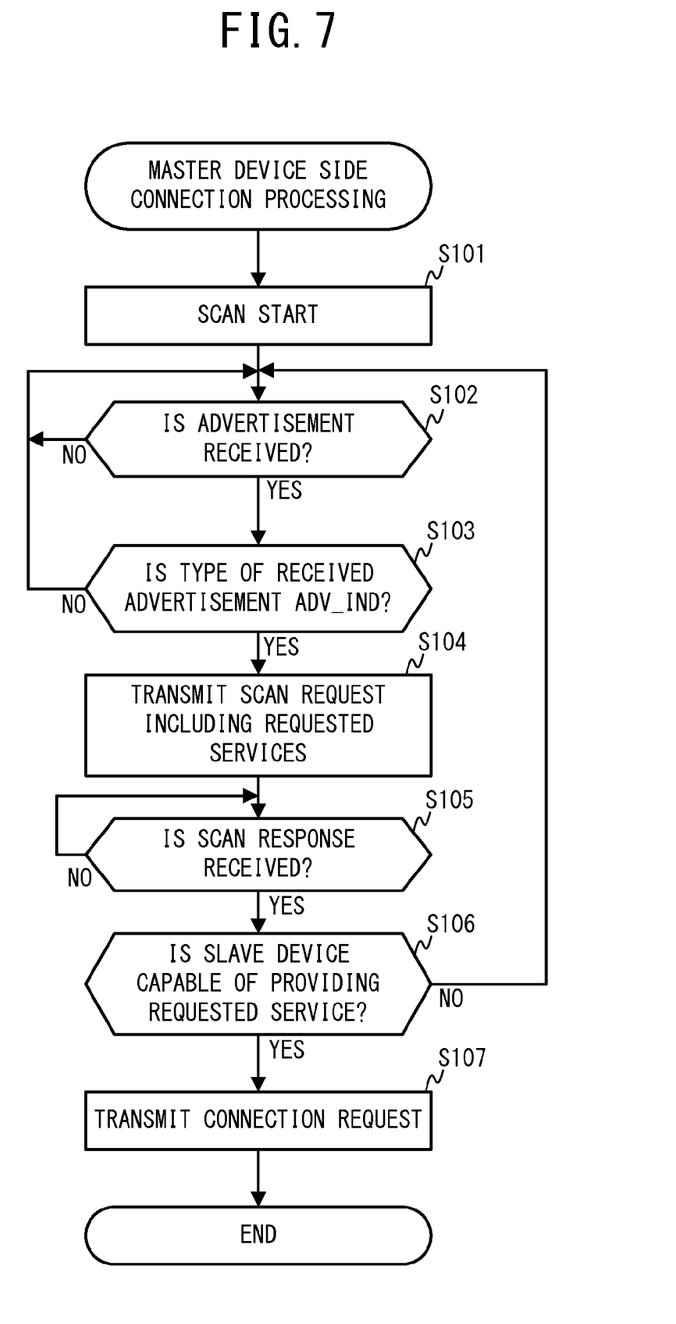
FIG. 7 is a flowchart illustrating an example of master device side connection processing that the master device according to the embodiment carries out.

Next, an operation of the master device 100 according to the embodiment will be described with reference to FIG. 7. FIG. 7 is a flowchart illustrating an example of master device side connection processing that the master device 100 according to the embodiment carries out. The master device side connection processing is carried out by the controller 101, which reads and executes a program that has been stored in the ROM 102 in advance.

The controller 101 of the master device 100, for example, triggered by the accepter 110 accepting a service request, starts the master device side connection processing illustrated in FIG. 7.

First, the advertisement acquirer 121 starts a scan of advertisements (step S101).

The advertisement acquirer 121 then decides whether or not an advertisement has been received from the slave device 200 (step S102). The advertisement acquirer 121 continues the scan until the advertisement acquirer 121 decides that an advertisement has been received (No in step S102).

When the advertisement acquirer 121 decides that an advertisement has been received (Yes in step S102), the advertisement acquirer 121 decides whether or not the type of the acquired advertisement is ADV_IND (step S103). When the advertisement acquirer 121 decides that the type of the acquired advertisement is not ADV_IND (No in step S103), the advertisement acquirer 121 returns to step S102 and continues the processing.

When the advertisement acquirer 121 decides that the type of the acquired advertisement is ADV_IND (Yes in step S103), the scan request transmitter 122 transmits, to the slave device 200 that has transmitted the advertisement received in step S102, a scan request including UUIDs in the accepted service request (step S104).

The connection establisher 130 then decides whether or not a scan response is received from the slave device 200 (step S105). The connection establisher 130 stands by until the connection establisher 130 decides that a scan response is received (No in step S105).

When the connection establisher 130 decides that a scan response is received (Yes in step S105), the connection establisher 130 decides whether or not the acquired scan response indicates that the slave device 200 is capable of providing the requested services (step S106). When the connection establisher 130 decides that the scan response indicates that the slave device 200 is incapable of providing the requested services (No in step S106), the connection establisher 130 returns to step S102 and continue the scan processing.

When the connection establisher 130 decides that the scan response indicates that the slave device 200 is capable of providing at least one requested service (Yes in step S106), the connection establisher 130 transmits a connection request to the slave device 200 (step S107). Then, the master device 100 establishes a connection to the slave device 200 and ends the processing.

Figure 8:
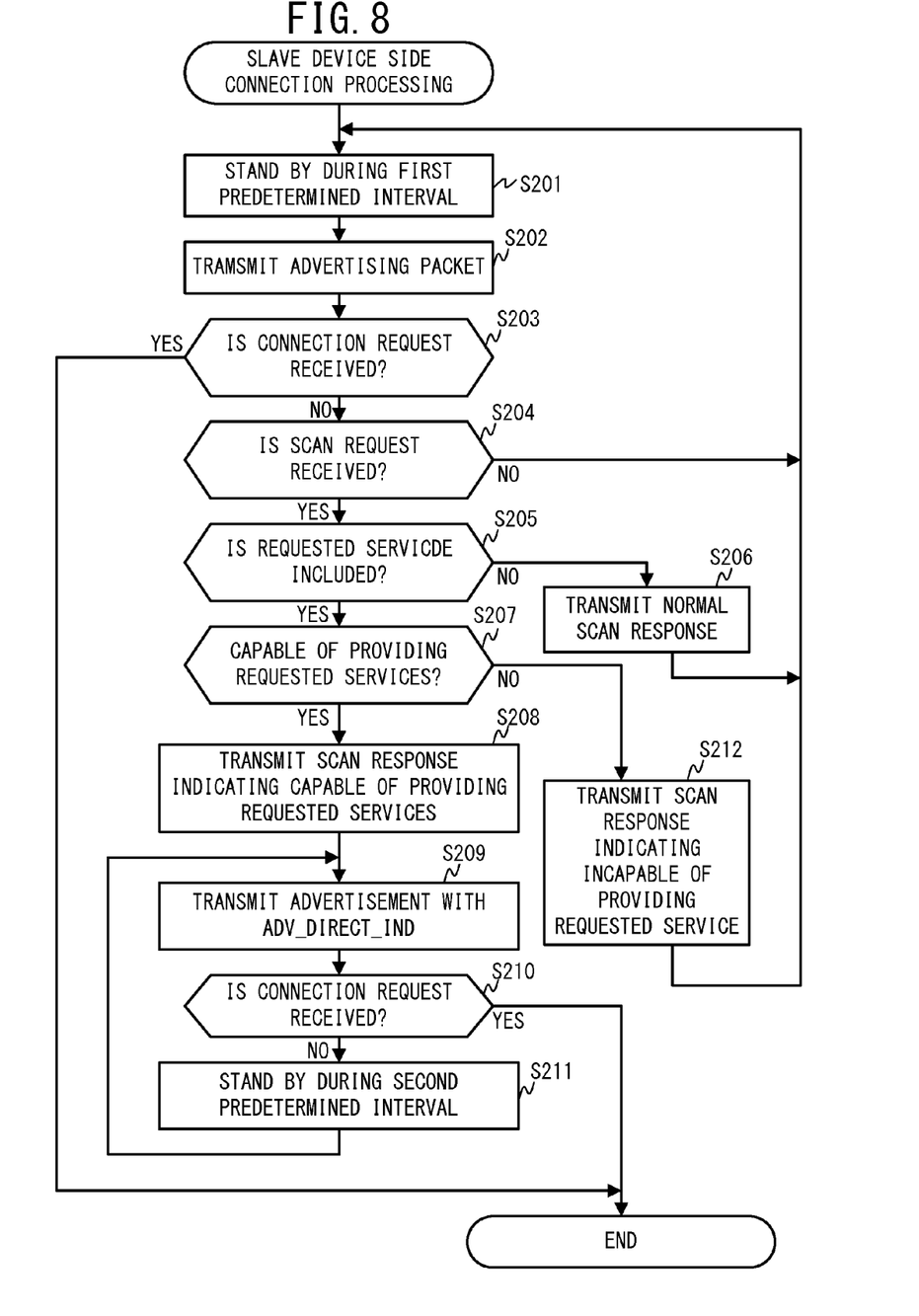
FIG. 8 is a flowchart illustrating an example of slave device side connection processing that the slave device according to the embodiment carries out.

Next, an operation of the slave device 200 according to the embodiment will be described with reference to FIG. 8. FIG. 8 is a flowchart illustrating an example of slave device side connection processing that the controller 201 of the slave device 200 according to the embodiment carries out. The slave device side connection processing is carried out by the controller 201 that reads and executes a program that has been stored in the ROM 202 in advance.

The advertisement transmitter 210 of the slave device 200, for example, triggered by the current time reaching a predetermined time, starts the slave device side connection processing illustrated in FIG. 8.

First, the advertisement transmitter 210 stands by during the first predetermined interval (step S201).

The advertisement transmitter 210 then transmits an advertising packet (step S202).

Next, the connection establisher 240 decides whether or not a connection request is received from the master device 100 (step S203). When the connection establisher 240 decides that a connection request is received (Yes in step S203), the connection establisher 240 establishes a connection to the master device 100 and ends the processing.

When the connection establisher 240 decides that no connection request is received from the master device 100 (No in step S203), the scan request acquirer 220 decides whether or not a scan request is received from the master device 100 (step S204). When the scan request acquirer 220 decides that no scan request is received from the master device 100 (No in step S204), the process returns to step S201 and the advertisement transmitter 210 continues the advertisement transmission processing.

When the scan request acquirer 220 decides that a scan request is received from the master device 100 (Yes in step S204), the service decider 230 decides whether or not the received scan request includes the UUIDs of requested services (step S205). When the service decider 230 decides that the received scan request does not include any UUID of a requested service (No in step S205), the service decider 230 transmits a normal scan response to the master device 100 (step S206), the process returns to step S201, and the advertisement transmitter 210 continues the advertisement transmission processing.

When the service decider 230 decides that the received scan request includes the UUIDs of requested services (Yes in step S205), the service decider 230 decides whether or not the slave device 200 itself is capable of providing services corresponding to the UUIDs of the requested services (step S207).

When the service decider 230 decides that the slave device 200 itself is capable of providing services corresponding to the UUIDs of some requested services (Yes in step S207), the service decider 230 transmits, to the master device 100, a scan response indicating that the slave device 200 is capable of providing some requested services (step S208).

Next, the advertisement transmitter 210 transmits an advertisement indicating that the type of the advertisement is ADV_DIRECT_IND and only a connection request from the master device 100 that has transmitted the scan request is acceptable (step S209). The connection establisher 240 then decides whether or not a connection request is received from the master device 100 (step S210). When the connection establisher 240 decides that a connection request is received (Yes in step S210), the connection establisher 240 establishes a connection to the master device 100 and ends the processing.

When the connection establisher 240 decides that no connection request is received (No in step S210), the advertisement transmitter 210 stands by during the second predetermined interval (step S211), the process returns to step S209, and the advertisement transmitter 210 continues the advertisement transmission processing.

When the service decider 230 decides that the slave device 200 itself is incapable of providing a service corresponding to the UUID of any requested service (No in step S207), the connection establisher 240 transmits, to the master device 100, a scan response indicating that the slave device 200 is incapable of providing any requested service (step S212). Then, the process returns to step S201 and the advertisement transmitter 210 continues the advertisement transmission processing.

As described thus far, the scan request packet that the master device 100 according to the embodiment transmits to the slave device 200 is expanded so that the UUIDs of requested services, which are information on services that the master device 100 itself requires, is added. The slave device 200 adds, to a scan response packet, information indicating whether or not the slave device 200 is capable of providing the requested services, which are included in the received scan request packet, and transmits the scan response packet to the master device 100. Thus, since the master device 100 is capable of deciding, without connecting to the slave device 200, whether or not the slave device 200 is capable of providing the requested services, the master device 100 is able to efficiently search the slave device 200 that is capable of providing the requested services.

Since the master device 100 decides whether or not the master device 100 transmits a scan request in accordance with the type of an advertisement received from the slave device 200, it is possible to suppress useless transmission of packets.

Since the slave device 200 that has decided that the slave device 200 is capable of providing the requested services transmits subsequent advertisements with an interval shorter than a regular advertisement interval, the slave device 200 is able to establish a connection to the master device 100 rapidly. Since the slave device 200 transmits an advertisement with a type of advertisement of ADV_DIRECT_IND, the slave device 200 is able to surely connect to the master device 100 that has transmitted the scan request without being affected by connection requests and scan requests from other devices.

The embodiment and variations of the present disclosure were described above, but the present disclosure is not limited by the above embodiment and variations.

For example, in the above-described embodiment, when the slave device 200 decides that the slave device 200 is capable of providing requested services included in a received scan request packet, the slave device 200 adds, to a scan response packet, information indicating that the slave device 200 is capable of providing the requested services and transmits the scan response packet to the master device 100. However, when the slave device 200 is capable of providing the requested services, the slave device 200 may carry out High Duty Cycle Directed Advertising without transmitting a scan response. With this configuration, the master device 100 is able to rapidly and surely connect to the slave device 200 that is capable of providing the requested services.

In the above-described embodiment, as illustrated in FIG. 1, the wireless communication system 1 is configure with a single master device 100 and a single slave device 200. However, the numbers of the master devices 100 and the slave devices 200 that compose the wireless communication system 1 are not limited to the above configuration, and each of the numbers of the master devices 100 and the slave devices 200 may be plural.

It is possible to achieve the master device 100 and the slave device 200 according to the present disclosure by using a general-purpose computer system, without using a dedicated device. For example, functions of the master device 100 and functions of the slave device 200 may be achieved by making computers execute programs. The programs to achieve functions of the master device 100 and functions of the slave device 200 may be stored in a non-transitory computer-readable recording medium, such as a USB (Universal Serial Bus) memory, an SD (Secure Digital) memory card, a CD-ROM (Compact Disc Read Only Memory), a DVD (Digital Versatile Disc), a BD (Blu-ray (Registered Trademark) Disc), an HDD (Hard Disk Drive), and so on, or downloaded to computers via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device, comprising:
    a communicator that (i) acquires identification information transmitted from another wireless communication device, (ii) decides, in accordance with a type of the acquired identification information, whether or not to transmit, to the other wireless communication device, a scan request that includes an inquiry about whether or not the other wireless communication device is capable of providing a predetermined service, and (iii) transmits the scan request when the communicator decides to transmit the scan request; and
    a controller that, based on a response from the other wireless communication device to the scan request, establishes a connection to the other wireless communication device.

2. The wireless communication device according to claim 1, wherein the controller establishes the connection to the other wireless communication device when the response from the other wireless communication device to the scan request indicates that the other wireless communication device is capable of providing the predetermined service.

3. A wireless communication device, comprising:
    a communicator that transmits identification information with a first predetermined interval and acquires, from another wireless communication device that receives the identification information, a scan request that includes an inquiry about whether or not the wireless communication device is capable of providing a predetermined service; and
    a controller that, when the communicator acquires the scan request, decides whether or not the wireless communication device is capable of providing the predetermined service,
    wherein:
    the communicator transmits, to the other wireless communication device, the identification information with a second predetermined interval which is shorter than the first predetermined interval when the controller decides that the wireless communication device is capable of providing the predetermined service, and
    when a connection request from the other wireless communication device is received, the controller establishes a connection to the other wireless communication device.

4. The wireless communication device according to claim 3, wherein the communicator transmits, to the other wireless communication device, a response that indicates that the wireless communication device is capable of providing the predetermined service when the controller decides that the wireless communication device is capable of providing the predetermined service.

5. The wireless communication device according to claim 3, wherein the communicator includes in the identification information transmitted with the second predetermined interval an indication that only a connection request from the other wireless communication device is received.

6. A non-transitory computer-readable medium having stored thereon a program that, when executed by a computer capable of carrying out wireless communication with a wireless communication device, causes the computer to perform operations including:
- acquiring identification information transmitted from the wireless communication device;
- deciding, in accordance with a type of the identification information acquired, whether or not to transmit a scan request that includes an inquiry about whether or not the wireless communication device is capable of providing a predetermined service;
- transmitting the scan request to the wireless communication device, when the computer decides to transmit the scan request; and
- establishing, based on a response from the wireless communication device to the scan request, a connection to the wireless communication device.

7. A non-transitory computer-readable medium having stored thereon a program that, when executed by a computer capable of carrying out wireless communication with a wireless communication device, causes the computer to perform operations including:
- transmitting identification information with a first predetermined interval;
- acquiring, from the wireless communication device that has received the identification information, a scan request that includes an inquiry about whether or not the computer itself is capable of providing a predetermined service;
- deciding, after acquiring the scan request, whether or not the computer itself is capable of providing the predetermined service;
- transmitting, to the wireless communication device, the identification information with a second predetermined interval which is shorter than the first predetermined interval, when it is decided that the computer is capable of providing the predetermined service; and
- establishing a connection to the wireless communication device when a connection request from the wireless communication device is received.

8. A master device that carries out wireless communication based on Bluetooth (Registered Trademark) low energy with a slave device, comprising:
- a communicator that (i) acquires an advertisement transmitted from the slave device, (ii) decides, in accordance with a type of the acquired advertisement, whether or not to transmit, to the slave device, a scan request that includes an inquiry about whether or not the slave device is capable of providing a predetermined service, and (iii) transmits the scan request when the communicator decides to transmit the scan request; and
- a controller that, based on a response from the slave device to the scan request, establishes a connection to the slave device.

9. A slave device that carries out wireless communication based on Bluetooth (Registered Trademark) low energy with a master device, comprising:
- a communicator that transmits advertisements with a first predetermined interval and acquires, from the master device that has received the advertisement, a scan request that includes an inquiry about whether or not the slave device is capable of providing a predetermined service; and
- a controller that, when the scan request is acquired, decides whether or not the slave device is capable of providing the predetermined service, wherein:
the communicator transmits, to the master device, advertisements with a second predetermined interval which is shorter than the first predetermined interval, when the controller decides that the slave device is capable of providing the predetermined service, and
when a connection request from the master device is received, the controller establishes a connection to the master device.

* * * * *